US 9,599,251 B2

(12) United States Patent
Lee et al.

(10) Patent No.: US 9,599,251 B2
(45) Date of Patent: Mar. 21, 2017

(54) CHECK VALVE DRIVING DEVICE FOR INJECTING GAS

(71) Applicant: HYUNDAI HEAVY INDUSTRIES CO., LTD., Ulsan (KR)

(72) Inventors: Dae-Jin Lee, Ulsan (KR); Dae-Yeoul Jung, Ulsan (KR); Sung-Hyeok Kim, Ulsan (KR); Kwang-Cheol Heo, Ulsan (KR); Jong-Suk Kim, Ulsan (KR)

(73) Assignee: HYUNDAI HEAVY INDUSTRIES CO., LTD. (KR)

( * ) Notice: Subject to any disclaimer, the term of this patent is extended or adjusted under 35 U.S.C. 154(b) by 220 days.

(21) Appl. No.: 14/374,968

(22) PCT Filed: Dec. 20, 2012

(86) PCT No.: PCT/KR2012/011142
§ 371 (c)(1),
(2) Date: Jul. 28, 2014

(87) PCT Pub. No.: WO2013/122317
PCT Pub. Date: Aug. 22, 2013

(65) Prior Publication Data
US 2015/0014565 A1    Jan. 15, 2015

(30) Foreign Application Priority Data

Feb. 13, 2012  (KR) .................. 10-2012-0014407
Feb. 13, 2012  (KR) .................. 10-2012-0014408

(51) Int. Cl.
*F16K 31/48*     (2006.01)
*F02M 21/02*     (2006.01)
(Continued)

(52) U.S. Cl.
CPC .......... *F16K 31/485* (2013.01); *F02B 19/108* (2013.01); *F02B 19/12* (2013.01);
(Continued)

(58) Field of Classification Search
CPC ........ F16K 27/02; F16K 27/0209; F16K 3/24; F16K 31/44; F16K 31/485;
(Continued)

(56) References Cited

U.S. PATENT DOCUMENTS 2,586,165 A * 2/1952 Hibner .................. F28G 15/00
                                                      15/318
5,000,138 A * 3/1991 Bennett ................ F01L 1/143
                                                      123/169 PA
(Continued)

FOREIGN PATENT DOCUMENTS

GB      286819 A  *  3/1928  ....... F16K 31/52408
GB      459054 A  * 12/1936  ....... F16K 31/52408
(Continued)

OTHER PUBLICATIONS

Written Opinion—PCT/KR2012/011142 dated Mar. 28, 2013.
(Continued)

*Primary Examiner* — Marina Tietjen
(74) *Attorney, Agent, or Firm* — Cantor Colburn LLP

(57) ABSTRACT

A check valve driving device for injecting gas, which enables an accurate operation of a check valve for injecting gas and long-term usage by enhancing durability, comprises: an upper portion fixing block which moves vertically by coupling onto a yoke repeating vertical movements; a lower portion fixing block which is coupled to a prechamber at a lower portion of the yoke; a roller which is rotatably coupled onto the upper portion fixing block, and of which a center portion diameter is bigger than diameters of both end portions; a guide, which is rotatably coupled onto the lower portion fixing block, for rotating when a curved surface on one side thereof comes into contact with the roller moving vertically; an operation piece, which is rotatably coupled onto the lower portion fixing block, wherein a front end of the operation piece moves vertically in accordance with the (Continued)

rotation of the guide; and a pressing rod which is coupled to the front end of the operation piece, and which is lowered in accordance with the lowering of the front end of the operation piece.

8 Claims, 6 Drawing Sheets

(51) Int. Cl.
| | |
|---|---|
| *F02B 19/10* | (2006.01) |
| *F02B 19/12* | (2006.01) |
| *F02M 61/20* | (2006.01) |
| *F16K 3/24* | (2006.01) |
| *F16K 31/44* | (2006.01) |
| *F16K 27/02* | (2006.01) |
| *F01L 3/08* | (2006.01) |

(52) U.S. Cl.
CPC .... *F02M 21/0242* (2013.01); *F02M 21/0251* (2013.01); *F02M 21/0269* (2013.01); *F02M 21/0275* (2013.01); *F02M 61/20* (2013.01); *F16K 3/24* (2013.01); *F16K 31/44* (2013.01); *F01L 3/08* (2013.01); *F16K 27/0209* (2013.01); *Y02T 10/125* (2013.01); *Y02T 10/32* (2013.01)

(58) Field of Classification Search
CPC ............. F16K 31/52408; F02M 61/20; F02M 21/0242; F02M 21/0251; F02M 21/0275; F02M 21/0269; F01L 3/20; F02B 19/108; F02B 19/12; Y02T 10/32; Y02T 10/125
USPC ........................ 251/229, 294, 251, 322, 323; 123/188.2–188.3, 188.17; 239/533.11, 239/584
See application file for complete search history.

(56) References Cited

U.S. PATENT DOCUMENTS

| | | | | |
|---|---|---|---|---|
| 5,011,079 A | * | 4/1991 | Perr | F02M 57/021 |
| | | | | 239/584 |
| 5,472,169 A | * | 12/1995 | Forney | B63B 13/02 |
| | | | | 251/263 |
| 6,062,826 A | * | 5/2000 | Morimoto | F16K 31/52408 |
| | | | | 137/624.13 |
| 7,406,953 B2 | | 8/2008 | Lewentz | |
| 2013/0139503 A1 | * | 6/2013 | Eggler | F16K 31/047 |
| | | | | 60/602 |
| 2014/0034029 A1 | * | 2/2014 | Sasaki | F02M 25/0773 |
| | | | | 123/568.26 |
| 2014/0131605 A1 | * | 5/2014 | Meyer | F16K 31/528 |
| | | | | 251/279 |
| 2015/0225259 A1 | * | 8/2015 | Yamaoka | B01J 49/0086 |
| | | | | 137/865 |

FOREIGN PATENT DOCUMENTS

| | | |
|---|---|---|
| JP | 60104752 | 6/1985 |
| JP | 11303708 | 11/1999 |
| JP | 2000073769 | 3/2000 |
| JP | 2001263069 | 9/2001 |
| JP | 2005529266 | 9/2005 |
| KR | 1020110053048 | 5/2011 |
| WO | 03093670 | 11/2003 |

OTHER PUBLICATIONS

International Search Report—PCT/KR2012/011142 dated Mar. 28, 2013.
Japanese Office Action—Japanese Application No. 2014-551181 issued on Dec. 26, 2016, citing KR 10-2011-0053048, JP 60-104752, JP 11-303708, JP 2005-529266, JP 2001-263069 and JP 2000-073769.

* cited by examiner

CHECK VALVE DRIVING DEVICE FOR INJECTING GAS

TECHNICAL FIELD

The present invention relates to a check valve driving device for injecting gas, and more particularly, to a check valve driving device for injecting gas, which enables an accurate operation of a check valve for injecting gas, easy adjustment of a gas spray time and a gas spray amount, and long-term usage by enhancing durability.

BACKGROUND ART

A check valve for injecting gas is provided in a prechamber of a gas engine and enables gas injection into a combustion chamber in the prechamber with an operation of the check valve for injecting gas.

That is, as a spindle of the check valve for injecting gas is lowered on a body, a through hole of the body is open so that gas injection can be performed into the combustion chamber of the prechamber, and as the spindle of the check valve for injecting gas is raised on the body, the through hole of the body is closed so that uncombusted gas can be prevented from flowing backward into the body.

Meanwhile, driving, i.e., vertical movements of the check valve for injecting gas are performed by a check valve driving device for injecting gas provided at an upper portion of the prechamber.

There are various types of check valve driving devices for injecting gas. However, in a check valve mechanically-driving device for injecting gas according to the related art, a time when the check valve for injecting gas is to be driven, is not accurate such that a gas spray time and a gas spray amount are not uniform through the check valve for injecting gas.

Also, the check valve mechanically-driving device for injecting gas according to the related art cannot easily perform adjustment of the gas spray time and the gas spray amount.

In addition, the check valve mechanically-driving device for injecting gas according to the related art has complicated structure and principle, and maintenance thereof is difficult. Thus, it is difficult to use the check valve mechanically-driving device for injecting gas according to the related art in a real life.

Furthermore, when the check valve mechanically-driving device for injecting gas according to the related art operates repeatedly, a burden occurs in particular parts thereof, and the check valve mechanically-driving device for injecting gas according to the related art is easily damaged such that long-term usage thereof is not performed.

For these reasons, development of a check valve driving device for injecting gas, which enables an accurate operation of a check valve for injecting gas and long-term usage by enhancing durability, has been attempted in the related art. However, satisfactory results thereof have not been obtained until now.

DISCLOSURE

Technical Problem

The present invention is directed to providing a check valve driving device for injecting gas, which enables an accurate operation of a check valve for injecting gas, easy adjustment of a gas spray time and a gas spray amount, and long-term usage by enhancing durability.

Technical Solution

One aspect of the present invention provides a check valve driving device for injecting gas, the check valve driving device including: an upper portion fixing block which moves vertically by coupling onto a yoke repeating vertical movements by driving a cam; a lower portion fixing block which is coupled to a prechamber at a lower portion of the yoke to which the upper portion fixing block is coupled; a roller which is rotatably coupled onto the upper portion fixing block, and of which a center portion diameter is bigger than diameters of both end portions; a guide, which is rotatably coupled onto the lower portion fixing block, for rotating when a curved surface on one side thereof comes into contact with the roller moving vertically; an operation piece, which is rotatably coupled onto the lower portion fixing block, wherein a front end of the operation piece moves vertically in accordance with the rotation of the guide; and a pressing rod which is coupled to the front end of the operation piece, and which is lowered in accordance with the lowering of the front end of the operation piece, so as to compress an upper end of a spindle on a check valve for injecting gas.

The upper portion fixing block may include: bolt coupling holes that are provided in both sides of a front surface of the upper portion fixing block and extend backward; and a through hole that is provided in a side of the upper portion fixing block and extends sideward.

The lower portion fixing block may include: bolt coupling holes that are provided in both sides of an upper surface of the lower portion fixing block and extend downward; and a through hole that is provided in a side of the lower portion fixing block and extends sideward.

The roller may include a penetration hole that is provided in a side of the roller and extends sideward.

The guide may include: an inclination portion that is provided at a curved surface of the guide; and a penetration hole that is provided at a side of the guide and extends sideward.

The operation piece may include: an uneven groove that is provided behind the operation piece and extends downward; a penetration hole that is provided in a side of the operation piece and extends sideward; and a hole which is provided in a front end of the operation piece, and of which an inner circumferential surface is formed as a thread.

The pressing rod may include: a thread that is formed on an outer surface of the pressing rod; a double nut that is coupled to an upper end of the pressing rod, and a lower end portion of the pressing rod that moves forward, backward, right, and left.

Effects of the Invention

As described above, in a check valve driving device for injecting gas according to the one or more embodiments of the present invention, a roller which is coupled onto an upper portion fixing block on a yoke repeating vertical movements in a predetermined period by driving a cam comes into contact with a guide on a lower portion fixing block which is coupled onto a prechamber, and a pressing rod on an operation piece moves vertically in accordance with the rotation of the guide caused by contact of the roller so as to compress an upper end of a spindle on the check valve for injecting gas so that an accurate operation of the check valve for injecting gas can be performed.

Also, in the check valve driving device for injecting gas according to the one or more embodiments of the present invention, a gas spray amount can be adjusted using the check valve by adjusting a height of the pressing rod on the operation piece, and the guide, of which an inclination portion is changed from the operation piece, is replaced with a new one so that easy adjustment of a gas spray time and the gas spray amount can be performed.

Furthermore, in the check valve driving device for injecting gas according to the one or more embodiments of the present invention, a diameter of a center portion of the roller is larger than diameters of both end portions, and the roller and the guide come into point contact with each other so that abrasion of the roller and the guide can be minimized during repeated operations and long-term usage of the check valve driving device for injecting gas can be performed.

BEST MODE OF THE INVENTION

Hereinafter, exemplary embodiments of the present invention will be described in detail.

Figure 1:
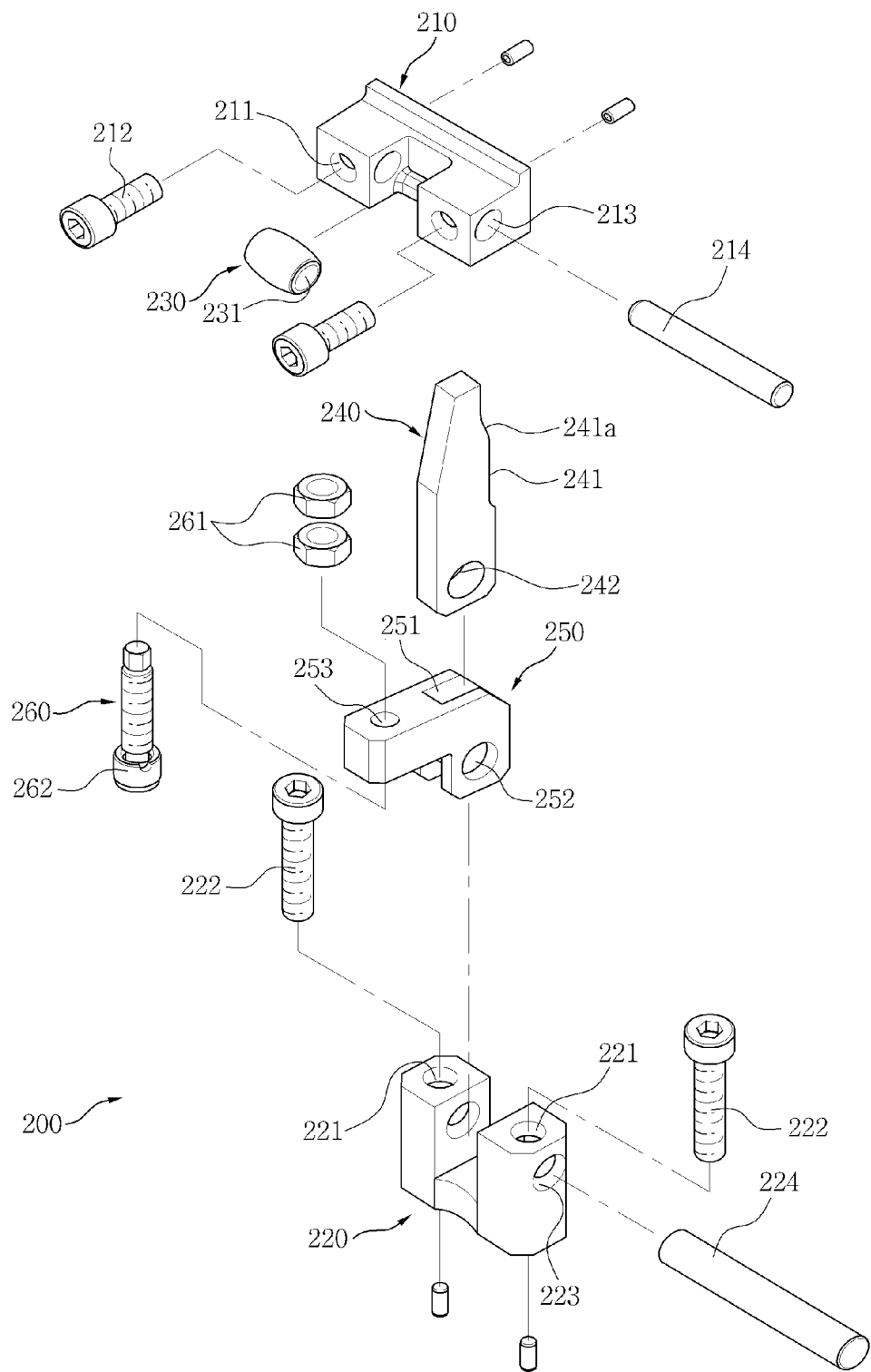
FIG. 1 is an exploded perspective view for describing a structure of a check valve driving device for injecting gas according to an exemplary embodiment of the present invention.
Figure 2:
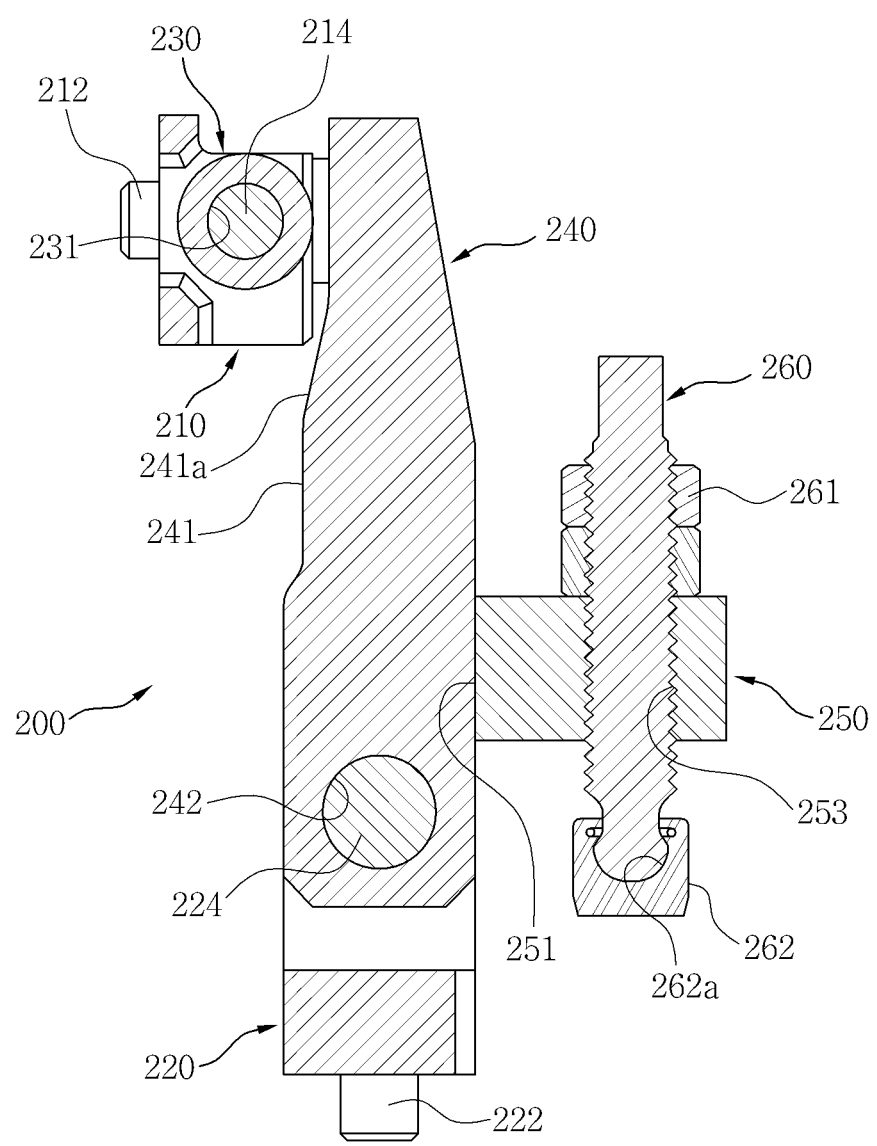
FIG. 2 is a cross-sectional view illustrating a coupled state of the check valve driving device for injecting gas illustrated in FIG. 1.

As illustrated in FIGS. 1 and 2, a check valve driving device 200 for injecting gas according to an exemplary embodiment of the present invention includes an upper portion fixing block 210, a lower portion fixing block 220, a roller 230, a guide 240, an operation piece 250, and a pressing rod 260.

The upper portion fixing block 210 is coupled onto a yoke 400 that repeats vertical movements by driving a cam (not shown) and operates in a vertical direction.

Bolt coupling holes 211 may be provided in both sides of a front surface of the upper portion fixing block 210 and may extend backward.

The bolt coupling holes 211 are provided in both sides of the front surface of the upper portion fixing block 210 to extend backward so that bolts 212 are coupled onto the upper portion fixing block 210 through the bolt coupling holes 211 in a state in which the bolt coupling holes 211 of the upper portion fixing block 210 and bolt coupling holes 410 formed in the yoke 400 are placed in the same line and the upper portion fixing block 210 can be coupled onto the yoke 400.

A through hole 213 may be provided in a side of the upper portion fixing block 210 and may extend sideward.

The through hole 213 is provided in the side of the upper portion fixing block 210 to extend sideward so that the roller 230 can be rotatably coupled onto the upper portion fixing block 210 by inserting a pin 214 into the upper portion fixing block 210 through the through hole 213.

The lower portion fixing block 220 is coupled to a prechamber 300 at a lower portion of the yoke 400 to which the upper portion fixing block 210 is coupled.

Bolt coupling holes 221 may be provided in both sides of a top surface of the lower portion fixing block 220 and may extend downward.

The bolt coupling holes 221 are provided in both sides of the top surface of the lower portion fixing block 220 to extend downward so that bolts 222 are coupled onto the lower portion fixing block 220 through the bolt coupling holes 221 in a state in which the bolt coupling holes 221 of the lower portion fixing block 220 and bolt coupling holes 310 formed in a top surface of the prechamber 300 are placed in the same line and the lower portion fixing block 220 can be coupled onto the prechamber 300.

A through hole 223 may be provided in a side of the lower portion fixing block 220 and may extend sideward.

The through hole 223 is provided in the side of the lower portion fixing block 220 to extend sideward so that the guide 240 and the operation piece 250 can be rotatably coupled onto the lower portion fixing block 220 by inserting a pin 224 into the lower portion fixing block 220 through the through hole 223.

The roller 230 is rotatably coupled onto the upper portion fixing block 210, and a diameter of a center portion of the roller 230 is larger than diameters of both end portions of the roller 230.

The diameter of the center portion of the roller 230 is larger than the diameters of both end portions of the roller 230 so as to minimize a contact surface formed when the roller 230 and the guide 240 contact each other. As the diameter of the center portion of the roller 230 is larger than the diameters of both end portions of the roller 230, the roller 230 and the guide 240 come into point contact with each other such that abrasion of the roller 230 and the guide 240 can be minimized.

Meanwhile, a penetration hole 231 may be provided in a side of the roller 230 and may extend sideward.

The penetration hole 231 is provided in the side of the roller 230 to extend sideward so that the pin 214 that is coupled onto the upper portion fixing block 210 can surround the upper portion fixing block 210 through the penetration hole 231 and the roller 230 can be rotated on the upper portion fixing block 210.

The guide 240 is rotatably coupled onto the lower portion fixing block 220 and is rotated when a curved surface 241 on one side of the guide 240 comes into contact with the roller 230 that moves vertically.

An inclination portion 241a may be provided at the curved surface 241 of the guide 240.

The inclination portion 241a is provided at the curved surface 241 of the guide 240 so that the rotation of the guide 240 can be gradually performed while the roller 230 proceeds along the inclination portion 241a.

Meanwhile, a penetration hole 242 may be provided in a side of the guide 240 and may extend sideward.

The penetration hole 242 is provided in the side of the guide 240 to extend sideward so that the pin 224 that is coupled onto the lower portion fixing block 220 can surround the lower portion fixing block 220 through the penetration hole 242 and the guide 240 can be rotated on the lower portion fixing block 220.

The operation piece 250 is rotatably coupled onto the lower portion fixing block 220, and a front end of the operation piece 250 moves vertically in accordance with the rotation of the guide 240.

An uneven groove 251 may be provided behind the operation piece 250 and may extend downward.

The uneven groove 251 is provided behind the operation piece 250 to extend downward so that the guide 240 can be inserted into an inner side of the operation piece 250 through the uneven groove 251.

A penetration hole 252 may be provided in a side of the operation piece 250 and may extend sideward.

The penetration hole 252 is provided in the side of the operation piece 250 to extend sideward so that the pin 224 that is coupled onto the lower portion fixing block 220 can surround the lower portion fixing block 220 through the penetration hole 252 and the operation piece 250 can be rotated on the lower portion fixing block 220.

A hole 253, of which an inner circumferential surface is formed as a thread, may be provided in a front end of the operation piece 250.

The hole 253, of which the inner circumferential surface is formed as the thread, is provided in the front end of the operation piece 250 so that the pressing rod 260 engages with the operation piece 250 with the thread through the hole 253 and can be coupled to the operation piece 250.

The pressing rod 260 is coupled to the front end of the operation piece 250, is lowered in accordance with the lowering of the front end of the operation piece 250 so as to compress an upper end of a spindle 120 of a check valve 100 for injecting gas.

A thread may be formed on an outer surface of the pressing rod 260.

The thread is formed on the outer surface of the pressing rod 260 so that the pressing rod 260 and the hole 253 of the operation piece 250 can engage with each other with the thread and the pressing rod 260 can be coupled onto the operation piece 250.

A double nut 261 may be coupled to an upper end of the pressing rod 260.

The double nut 261 is coupled to the upper end of the pressing rod 260 so that the pressing rod 260 can be prevented from flowing on the operation piece 250 and a degree of protrusion of the pressing rod 260 from the operation piece 250 can be adjusted by adjusting a height of coupling of the double nut 261.

In this case, a lower end portion of the pressing rod 260 may move forward, backward, right, and left.

The lower end portion of the pressing rod 260 moves forward, backward, right, and left so that, when the lower end portion of the pressing rod 260 compresses the upper end of the spindle 120, the pressing rod 260 and the spindle 120 come into close contact with each other by movement of the lower end portion of the pressing rod 260 and the spindle 120 can be smoothly compressed by the pressing rod 260.

In this case, forward, backward, right, and left movements of the lower end portion of the pressing rod 260 can be performed when the lower end of the pressing rod 260 has a hemispherical shape and a compression member 262 in which an accommodation groove 262a corresponding to the hemispherical shape is formed, is coupled to the lower end of the pressing rod 260 having the hemispherical shape.

Meanwhile, the check valve 100 will now be described in detail.

Figure 5:
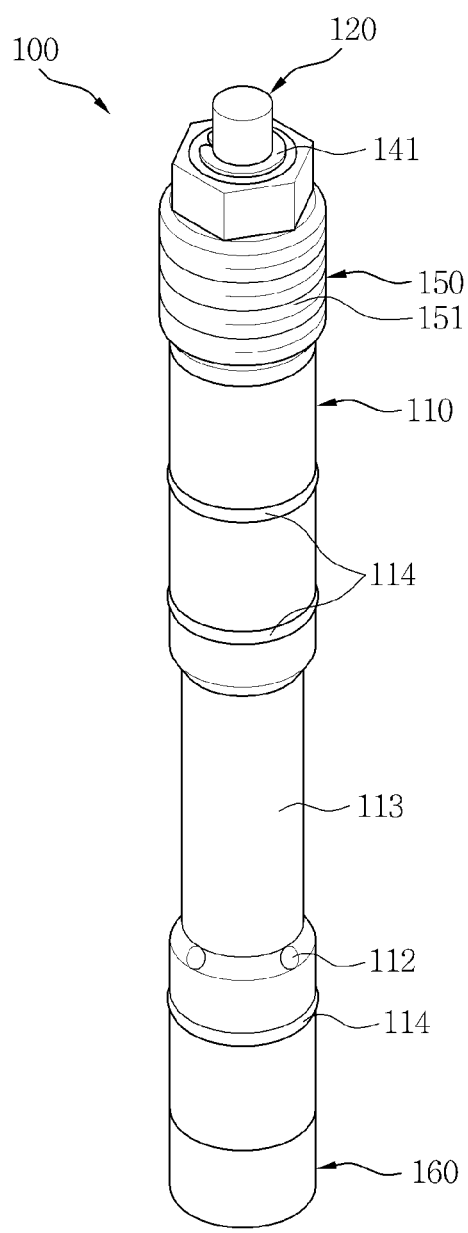
FIG. 5 is a perspective view illustrating an exterior of a check valve that is driven by the check valve driving device for injecting gas of FIG. 1.
Figure 6:
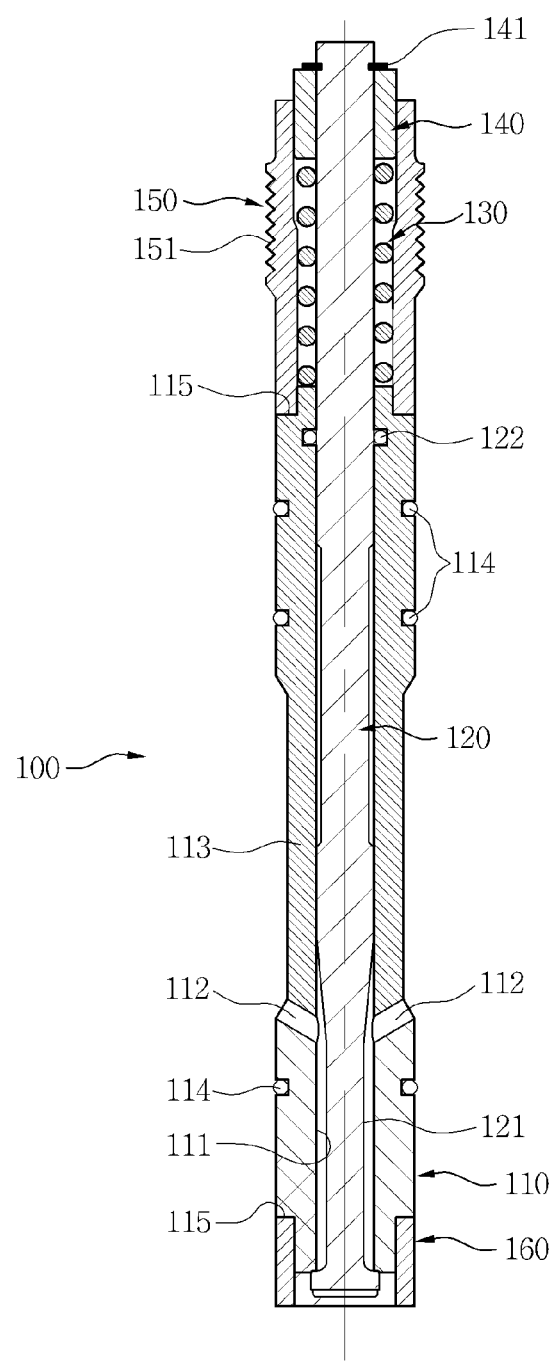
FIG. 6 is a cross-sectional view illustrating a coupled state for describing a structure of the check valve that is driven by the check valve driving device for injecting gas of FIG. 1.

As illustrated in FIGS. 5 and 6, the check valve 100 includes a body 110, the spindle 120, a spring 130, a spring seat 140, a coupling ring 150, and a spacer 160.

The body 110 includes a neck-down portion 113 that is provided on an outer surface of an upper portion of a gas flow hole 112 and has a smaller diameter than diameters of other portions.

The body 110 may be integrally formed.

The body 110 is integrally formed so that the number of parts can be minimized.

The gas flow hole 112 of the body 110 may extend in all directions.

The gas flow hole 112 of the body 110 extends in all directions so that gas inflow through the gas flow hole 112 can be uniformly performed regardless of a direction.

A sealing 114 may be continuously coupled to an outer surface of the body 110 at vertical intervals.

The sealing 114 is continuously coupled to the outer surface of the body 110 at vertical intervals so that an airtight state of a coupling portion of the body 110 can be maintained.

A short jaw 115 may be formed at an upper end portion and a lower end portion of the body 110.

The short jaw 115 is formed at the upper end portion and the lower end portion of the body 110 so that a lower end of the coupling ring 150 comes into contact with the short jaw 115 of the upper end portion of the body 110 and as the coupling ring 150 is coupled to the prechamber 300, the lower end of the coupling ring 150 presses the short jaw 115 formed at the upper end portion of the body 110 and can be fixed within the prechamber 300 and the short jaw 115 of the lower end portion of the body 110 comes into contact with the upper end of the spacer 160 and as the body 110 is fixed, the spacer 160 can be fixed to the body 110.

Meanwhile, a through hole 111 may be provided in a center of an inner side of the body 110 and may extend from upward to downward.

The through hole 111 is provided in the center of the inner side of the body 110 to extend from upward to downward so that the spindle 120 can be inserted into the inner side of the body 110.

The spindle 120 perpendicularly penetrates the body 110, and a neck-down portion 121 having a smaller diameter than diameters of other portions is provided on an outer surface placed below the gas flow hole 112.

The spindle 120 may be integrally formed.

The spindle 120 is integrally formed so that the number of parts can be minimized.

Meanwhile, an O-ring 122 may be provided at an upper end portion of the spindle 120 to contact an inner surface of the through hole 111 of the body 110.

The O-ring 122 is provided at the upper end portion of the spindle 120 to contact the inner surface of the body 110 so that an airtight state between the outer surface of the spindle 120 and the inner surface of the through hole 111 of the body 110 can be maintained.

The spring 130 surrounds the upper end portion of the spindle 120.

Since the spring 130 may be a conventional spring that may be contracted or extend, a detailed description of a structure and an operation of the spring 130 will be omitted.

The spring seat 140 is used to fix the spring 130 that surrounds the upper end portion of the spindle 120 onto the spindle 120 and guides the spindle 120 in a vertical state.

The spring seat 140 may be coupled to the spindle 120 by coupling a split ring 141.

The spring seat 140 is coupled to the spindle 120 by coupling the split ring 141 so that the coupling of the spring seat 140 can be conveniently performed.

The coupling ring 150 is coupled to the upper end of the body 110 and is used to fix the body 110 to the prechamber 300.

A thread 151 may be formed on an outer surface of the coupling ring 150.

The thread 151 is formed on the outer surface of the coupling ring 150 so that the coupling ring 150 can be coupled to the prechamber 300 with thread engagement.

Meanwhile, an upper end portion of the coupling ring 150 may have a nut shape.

The upper end portion of the coupling ring 150 has the nut shape so that the rotation of the coupling ring 150 can be easily performed.

The spacer 160 is coupled onto the lower end of the body 110 and fixes the lower end of the body 110 that covers an outer edge of the spindle 120 to the prechamber 300.

The spacer 160 is placed between the body 110 and the prechamber 300.

MODES OF THE INVENTION

Driving of the check valve 100 using the check valve driving device 200 for injecting gas illustrated in FIGS. 1 and 2 will now be described in detail.

First, the upper portion fixing block 210 is lowered in accordance with the lowering of the yoke 400.

Figure 3:
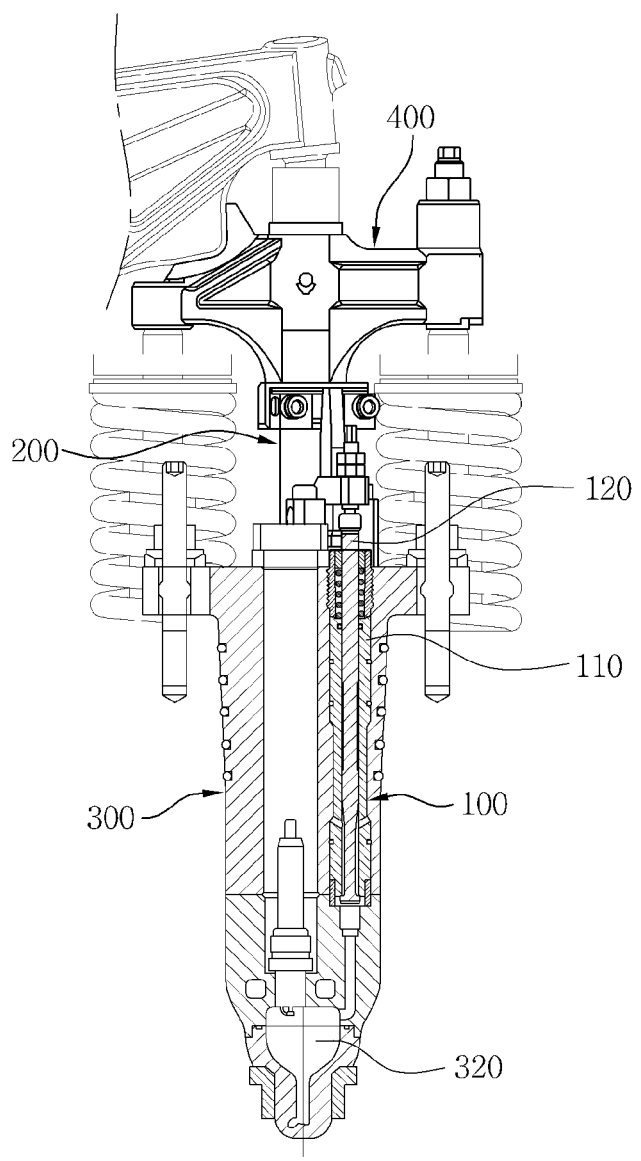
FIG. 3 is a view illustrating a usage state of the check valve driving device for injecting gas of FIG. 1.

In the present invention, the upper portion fixing block 210 onto which the roller 230 is coupled, is coupled onto the yoke 400 that repeats vertical movements by driving the cam, as illustrated in FIG. 3. Thus, when the yoke 400 is lowered by driving the cam, the upper portion fixing block 210 coupled to the yoke 400 is lowered.

Next, the guide 240 is rotated in accordance with the lowering of the upper portion fixing block 210.

In the present invention, the lower portion fixing block 220 onto which the guide 240 is coupled, is coupled to the prechamber 300 of a lower portion of the yoke 400. Thus, when the upper portion fixing block 210 is lowered, the roller 230 coupled onto the upper portion fixing block 210 comes into contact with the curved surface 241 of the guide 240 coupled onto the lower portion fixing block 220.

In this case, the guide 240 is rotatably coupled onto the lower portion fixing block 220, and the inclination portion 241a is provided at the curved surface 241 of the guide 240. Thus, when the roller 230 is lowered in contact with the inclination portion 241a, the front end of the roller 230 pushes the guide 240 on one side of the guide 240 and thus, the guide 240 is rotated on the lower portion fixing block 220.

Here, the roller 230 according to the present invention has a larger diameter of a center portion than diameters of both end portions. Thus, the roller 230 and the curved surface 241 of the guide 240 come into point contact with each other. Thus, even if contact between the roller 230 and the guide 240 is repeated, abrasion of the roller 230 and the guide 240 can be minimized, and lowering of a life span caused by abrasion of the roller 230 and the guide 240 can be prevented.

Next, the operation piece 250 is rotated in accordance with the rotation of the guide 240.

In the present invention, the guide 240 is placed at the inner side of the operation piece 250 in which the uneven groove 251 is formed, and the operation piece 250 is rotatably coupled onto the lower portion fixing block 220.

Thus, when rotation of the guide 240 is performed, the front end of the guide 240 pushes the operation piece 250 on one side of the operation piece 250 so that the operation piece 250 can be rotated on the lower portion fixing block 220.

Next, the pressing rod 260 compresses the upper end of the spindle 120 of the check valve 100 in accordance with the rotation of the operation piece 250.

Figure 4:
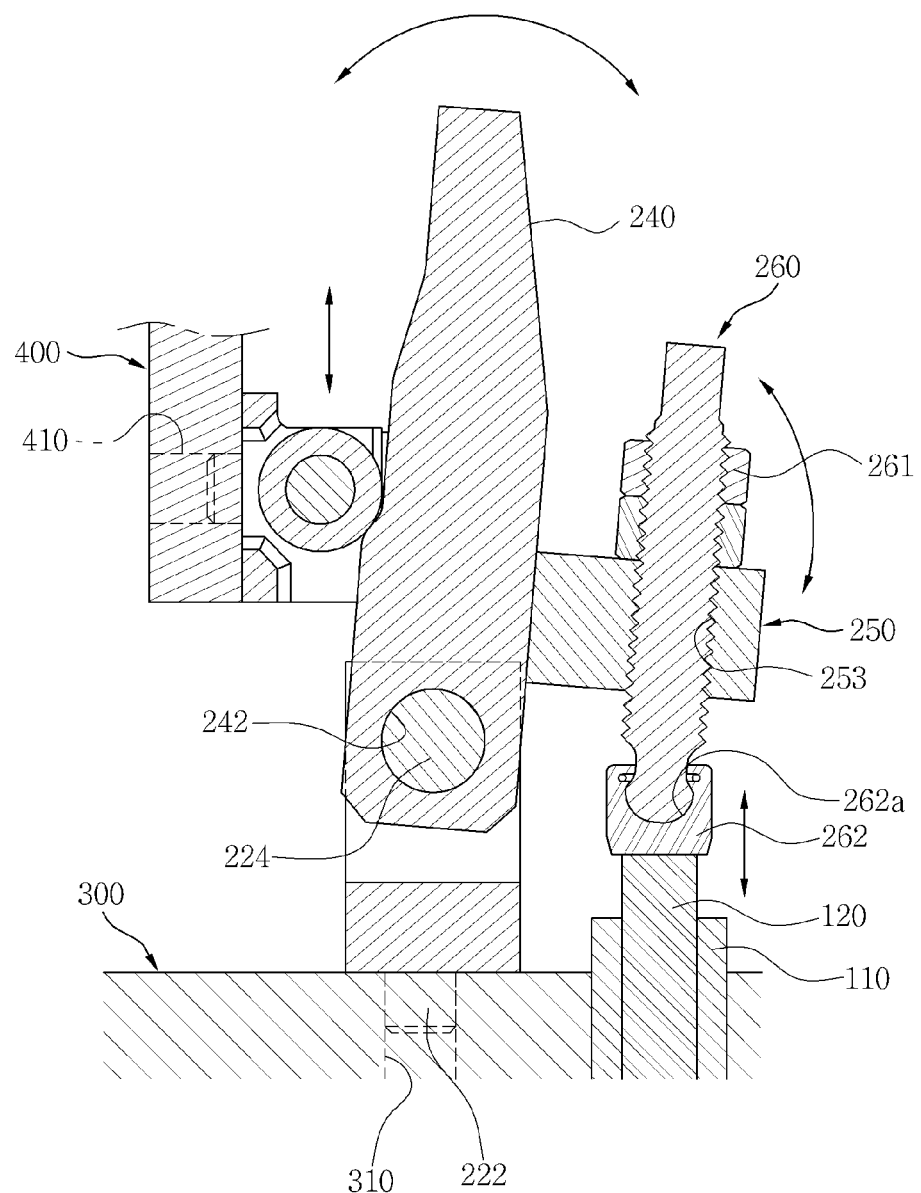
FIG. 4 is a view illustrating an operation state for describing spindle compression using a pressing rod of the check valve driving device for injecting gas of FIG. 1.

In the present invention, the pressing rod 260 having a lower end that is adjacent to the upper end of the spindle 120 of the check valve 100, is provided at the front end of the operation piece 250. Thus, when the operation piece 250 is rotated, as illustrated in FIG. 4, the front end of the operation piece 250 is lowered, and the pressing rod 260 of the front end of the operation piece 250 compresses the upper end of the spindle 120 of the check valve 100.

In this case, the lower end of the spindle 120 compressed by the pressing rod 260 protrudes toward the lower portion of the body 110 of the check valve 100, and the through hole 111 formed in the body 110 of the check valve 100 is open. Thus, gas discharged from the through hole 111 can be injected into a combustion chamber 320 of the prechamber 300.

The check valve driving device 200 for injecting gas illustrated in FIGS. 1 and 2 when the check valve 100 is driven, uses periodic vertical movements of the yoke 400 driven by the cam. Thus, an accurate operation of the check valve 100 can be performed.

Meanwhile, adjustment of a gas spray time and a gas spray amount of the check valve 100 using the check valve driving device 200 for injecting gas according to the present invention will now be described in detail.

In the present invention, the upper end of the pressing rod 260 is coupled to the operation piece 250 by coupling the double nut 261. Thus, when the height of coupling of the double nut 261 is adjusted, a degree of protrusion of the pressing rod 260 from the operation piece 250 can be adjusted.

Thus, when the gas spray amount of the check valve 100 is increased compared to the related art, the double nut 261 is coupled at a smaller height compared to the related art so that the degree of protrusion of the pressing rod 260 from the operation piece 250 is reduced. Then, a distance between the lower end of the pressing rod 260 and the upper end of the spindle 120 increases so that a lift of the check valve 100 increases and the gas spray amount can be increased.

In contrast, when the gas spray time of the check valve 100 is antedated compared to the related art, the double nut 261 is coupled at a larger height compared to the related art so that the degree of protrusion of the pressing rod 260 from the operation piece 250 increases. Then, the distance between the lower end of the pressing rod 260 and the upper end of the spindle 120 is reduced so that the lift of the check valve 100 is reduced and the gas spray amount can be reduced.

In the present invention, the guide 240 can be replaced from the operation piece 250. Thus, a shape of the inclination portion 241a at the curved surface 241 of the guide 240 varies so that the gas spray time and the gas spray amount can be adjusted.

Thus, in a case in which the gas spray time of the check valve 100 is antedated so as to increase the gas spray amount, when the guide 240 is replaced with a new one while the position of the inclination portion 241a of the guide 240 is raised, the roller 230 comes into contact with the inclination portion 241a quickly compared to the related art so that the gas spray time can be antedated.

In contrast, in a case in which the gas spray time of the check valve 100 is delayed so as to reduce the gas spray amount, when the guide 240 is replaced with a new one by lowering the position of the inclination portion 241a of the guide 240, the roller 230 comes into contact with the inclination portion 241a slowly compared to the related art so that the gas spray time can be delayed.

Meanwhile, the yoke 400 in the lowered state is raised by driving the cam.

When the yoke 400 is raised by driving the cam, the upper portion fixing block 210 coupled to the yoke 400 is raised, and the roller 230 is released from a state in which the roller 230 comes into contact with the guide 240 and thus, the guide 240 is returned to its pre-rotation state.

In this way, when the guide 240 is returned to its pre-rotation state, the operation piece 250 that is rotated by the guide 240 is returned to its pre-rotation state, and as the operation piece 250 is returned to its pre-rotation state, the pressing rod 260 coupled to the front end of the operation piece 250 is also returned to its pre-lowering state.

Thus, the spindle 120 that is pressed by the lower end of the pressing rod 260 may be returned to its pre-lowering state with elasticity of the spring 130 mounted within the check valve 100 so that the through hole 111 provided in the body 110 of the check valve 100 is closed and uncombusted gas can be prevented from flowing backward into the check valve 100.

As described above, in the check valve driving device 200 for injecting gas according to the present invention, the roller 230 coupled onto the upper portion fixing block 210 on the yoke 400 that repeats vertical movements in a predetermined period by driving the cam comes into contact with the guide 240 on the lower portion fixing block 220 coupled onto the prechamber 300, and the pressing rod 260 on the operation piece 250 is raised and lowered in accordance with the rotation of the guide 240 caused by contact with the roller 230 so as to compress the upper end of the spindle 120 of the check valve 100 for injecting gas so that an accurate operation of the check valve 100 can be performed.

Also, in the check valve driving device 200 for injecting gas according to the present invention, adjustment of the gas spray amount can be performed using the check valve 100 by adjusting the height of the pressing rod 260 on the operation piece 250, and the guide 240, of which the inclination portion 241a is changed from the operation piece 250, is replaced with a new one so that the gas spray time and the gas spray amount can be easily adjusted.

Furthermore, in the check valve driving device 200 for injecting gas according to the present invention, a diameter of a center portion of the roller 230 is larger than diameters of both end portions, and the roller 230 and the guide 240 come into point contact with each other so that abrasion of the roller 230 and the guide 240 can be minimized during repeated operations and thus long-term usage of the check valve driving device 200 for injecting gas can be performed.

While the invention has been shown and described with reference to certain exemplary embodiments thereof, it will be understood by those skilled in the art that various changes in form and details may be made therein without departing from the spirit and scope of the invention as defined by the appended claims.

INDUSTRIAL APPLICABILITY

The present invention enables minimized abrasion of main parts, such as a roller and a guide, and long-term usage, an accurate operation of a check valve, and easy adjustment of a gas spray time and a gas spray amount of the check valve and can be applied to a device, such as a gas engine that is driven by supplying fuel gas.

The invention claimed is:

1. A check valve driving device for injecting gas, the check valve driving device comprising:
   an upper portion fixing block which moves vertically by coupling onto a yoke repeating vertical movements by driving a cam;
   a lower portion fixing block which is coupled to a prechamber at a lower portion of the yoke to which the upper portion fixing block is coupled;
   a roller which is rotatably coupled onto the upper portion fixing block, and of which a center portion diameter is bigger than diameters of two end portions thereof;
   a guide, which is rotatably coupled onto the lower portion fixing block, for rotating when a curved surface on one side thereof comes into contact with the roller moving vertically;
   an operation piece, which is rotatably coupled onto the lower portion fixing block, wherein a front end of the operation piece moves vertically in accordance with the rotation of the guide; and
   a pressing rod which is coupled to the front end of the operation piece, and which is lowered in accordance with the lowering of the front end of the operation piece, so as to compress an upper end of a spindle on a check valve for injecting gas.

2. The check valve driving device of claim 1, wherein the upper portion fixing block comprises:
   bolt coupling holes that are provided in both sides of a front surface of the upper portion fixing block and extend backward; and
   a through hole that is provided in a side of the upper portion fixing block and extends sideward.

3. The check valve driving device of claim 1, wherein the lower portion fixing block comprises:
   bolt coupling holes that are provided in both sides of an upper surface of the lower portion fixing block and extend downward; and
   a through hole that is provided in a side of the lower portion fixing block and extends sideward.

4. The check valve driving device of claim 1, wherein the roller comprises a penetration hole that is provided in a side of the roller and extends sideward.

5. The check valve driving device of claim 1, wherein the guide comprises:
   an inclination portion that is provided at a curved surface of the guide; and
   a penetration hole that is provided at a side of the guide and extends sideward.

6. The check valve driving device of claim 1, wherein the operation piece comprises:
   an uneven groove that is provided behind the operation piece and extends downward;
   a penetration hole that is provided in a side of the operation piece and extends sideward; and
   a hole which is provided in a front end of the operation piece, and of which an inner circumferential surface is formed as a thread.

7. The check valve driving device of claim 1, wherein the pressing rod comprises:
   a thread that is formed on an outer surface of the pressing rod;

a double nut that is coupled to an upper end of the pressing rod, and a lower end portion of the pressing rod that moves forward, backward, right, and left.

8. The check valve driving device of claim 7, wherein a lower end of the pressing rod has a hemispherical shape, and a compression member in which an accommodation groove corresponding to the hemispherical shape is formed, is coupled to the hemispherical lower end of the pressing rod.

* * * * *